United States Patent [19]

Mooradian

[11] Patent Number: 5,479,931
[45] Date of Patent: Jan. 2, 1996

[54] IR THERMOMETER

[75] Inventor: Mark Mooradian, San Diego, Calif.

[73] Assignee: Thermoscan, Inc., San Diego, Calif.

[21] Appl. No.: 154,276

[22] Filed: Nov. 18, 1993

[51] Int. Cl.⁶ .................... A61B 5/05; A61B 6/00
[52] U.S. Cl. ............................... 128/664; 128/634
[58] Field of Search ...................... 128/633, 634, 128/664, 665, 736; 356/39–42

[56] References Cited

U.S. PATENT DOCUMENTS

| | | | |
|---|---|---|---|
| 3,498,286 | 3/1970 | Polanyi et al. | 128/634 |
| 4,054,356 | 10/1977 | Marx et al. | |
| 4,790,324 | 12/1988 | O'Hara et al. | 128/664 |
| 5,167,235 | 12/1992 | Seacord et al. | 128/736 |
| 5,232,284 | 8/1993 | Egawa et al. | 128/664 |
| 5,293,877 | 3/1994 | O'Hara et al. | 128/736 |
| 5,309,533 | 5/1994 | Bonniau et al. | |

Primary Examiner—Angela D. Sykes
Assistant Examiner—Samuel Gilbert
Attorney, Agent, or Firm—Hopgood, Calimafde, Kalil & Judlowe

[57] ABSTRACT

A novel wave guide assembly for use in an IR thermometer of the type used in measuring temperature of the tympanic membrane of the ear for body temperature determinations. The assembly provides a unique arrangement of spacers and a protective sheath to create a durable yet inexpensive wave guide. The spacer includes radially offset contact points that induce moment arms to absorb shock and other forms of rough handling encountered in daily use.

4 Claims, 5 Drawing Sheets

IR THERMOMETER

IMPROVED IR THERMOMETER

The present invention generally relates to infrared thermometers of the type used to measure body temperature by collecting IR emissions from a patient's tympanic membrane, and more specifically, a novel light wave guide packaging system for higher accuracy and greater durability.

BACKGROUND OF THE INVENTION

IR thermometers are fast becoming a staple item in health care operations and have revolutionized routine care procedures by eliminating or dramatically reducing the lag time associated with temperature determination in diagnosis. As opposed to prior temperature measuring devices such as conventional mercury thermometers, an IR thermometer is a sophisticated optical—electronic assembly with precision designed and assembled components requiring tightly toleranced and exacting specifications for proper operation. Attention is directed to the teachings of U.S. Pat. No. 4,797,840 entitled "Infrared Electronic Thermometer And Method For Measuring Temperature" by Jacob Fraden, for a general description of IR thermometer design and operative characteristics. The teaching of the above-identified patent is incorporated by reference.

A critical aspect of IR thermometer operation is the positional arrangement of the wave guide and the sensor inside the body of the device. From a functional standpoint, the wave guide acts to collect the radiation emanating from the tympanic membrane of the patient's ear and accurately guide this radiation to the sensor with minimal external influences. The sensor receives the guided radiation and generates a temperature reading as characterized by the quantum of radiation sensed. The accuracy of the resulting reading depends in part on the purity of the IR radiation passed to the sensor by the wave guide. The performance of the thermometer will therefore depend in great measure on the design of the wave guide and its relationship with the other components of the thermometer.

Another important consideration in system design is the durability of the precisely arranged components. A system that leaves the factory with acutely sensitive settings that are quickly lost within the first few days of use has significantly reduced value to the consumer. Indeed, thermometers that become inaccurate through the normal bumping and shaking encountered in daily use are of limited value regardless of the initial accuracy from the factory. It has, therefore, become a critical aspect of thermometer design to devise an arrangement of operative elements that incorporates a ruggedness and durability sufficient to withstand daily abuse in practice without significant loss of performance.

To attain these objectives, much progress has been made in packaging the electronics and electro-mechanical components to withstand typical daily rigors of use. These are important advancements that allow greater use of the product at less cost and concern about abuse. Notwithstanding this progress, IR thermometers remain prone to loss of fidelity due to normal bumps. This fidelity loss is often traced to the optics discussed above, wherein heavy handed use causes slight but signal disruptive misalignment of the wave guide. Significant misalignment of the optics will dramatically curtail the IR thermometers accuracy.

It was with this understanding of the problems associated with prior optic system design that led to the present invention.

OBJECTS AND SUMMARY OF THE PRESENT INVENTION

It is an object of the present invention to provide an apparatus for protecting the positional integrity of an optic system used in conjunction with an IR thermometer.

It is another object of the present invention to provide a packaging arrangement that provides shock resistance to optical elements arranged in an IR thermometer.

It is a further object of the present invention to provide an arrangement of concentric elements and specifically delineated spaces between the elements to create a low impact resistant optical instrument.

It is yet another object of the present invention to provide a shock resistant wave guide that is economical to manufacture and inexpensive to assemble.

The above and other objects are realized in a wave guide system that combines precision optics with an external rigid protective sheath. The outer sheath is positioned concentrically around the wave guide but spaced therefrom, creating a precisely dimensioned gap between the wave guide and the outer sheath. Within this annular gap, a semi-rigid spacer is placed establishing line contact with both the outer sheath and the inner wave guide. The line contact with the inner wave guide is radially offset from the line contact with the outer sheath thus creating a matrix of perpendicular bending moments at regular intervals within the spacing structure.

In accordance with the varying aspects of the present invention, a continuous sleeve is positioned in the annular space between the wave guide and the outer sheath, wherein the sleeve has plural tabs extending therefrom, selectively positioned to permit slight deformation in response to external forces, bumps or rough handling.

The foregoing features of the present invention may be more fully appreciated in the context of a specific illustrative example thereof presented in conjunction with accompanying drawing of which:

DESCRIPTION OF THE PRESENT INVENTION

The present invention generally provides a shock absorbing spacer to prevent physical distortions and damage to the light transmission medium in light-based analytic instruments such as IR thermometers. The spacer is positioned and configured within an annular gap between the transmission medium and an outer sheath to form a series of contact points that are radially offset. By positioning the supporting contact points in offset orientation, the impingement of external forces on the transmission medium are translated into bending moments along the perimeter of the spacer— thereby dissipating the force without distortion to the transmission medium.

Figure 1:
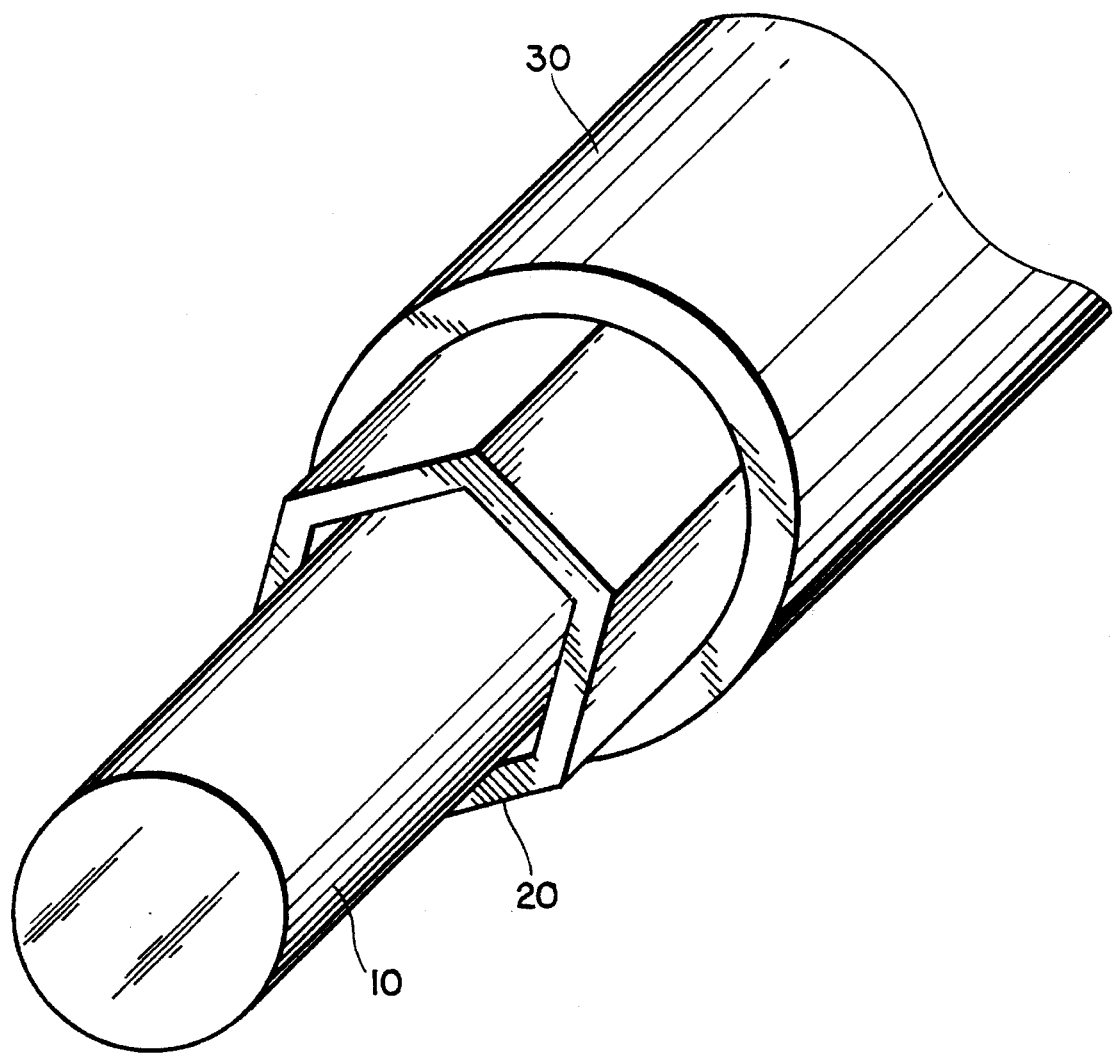
FIG. 1 is a perspective view of an illustrative sheathing arrangement in accordance with the present invention.

Turning now to the Drawing, FIG. 1 depicts the layered arrangement of the transmission medium (wave guide or other, depending on application), spacer and outer sheath. Specifically, a light transmission medium 10 having a generally cylindrical shape is encased by a protective sheath 30 having a generally circular inner diameter that is greater than the outer diameter of the transmission medium forming an annular gap therebetween. The spacer 20 is positioned in a snug fit in this annular gap, wherein the spacer has a cross-sectional shape that departs from both the outer surface of the transmission medium and the inner surface of the protective sheath. In this way, open areas are created between the spacer 20, the protective sheath 30 and the transmission medium.

Figure 2A:
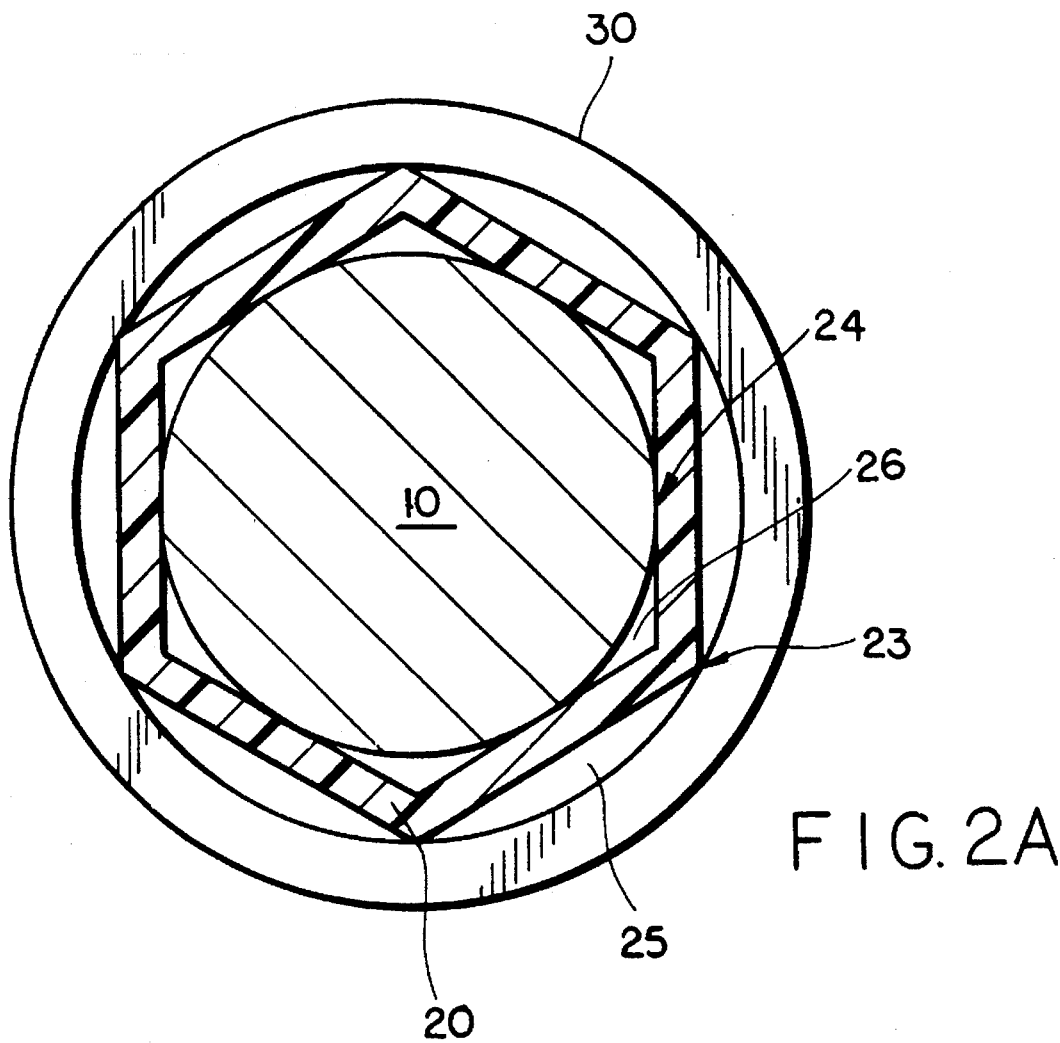
FIG. 2A is a cross-sectional view of the embodiment depicted in FIG. 1.
Figure 2B:
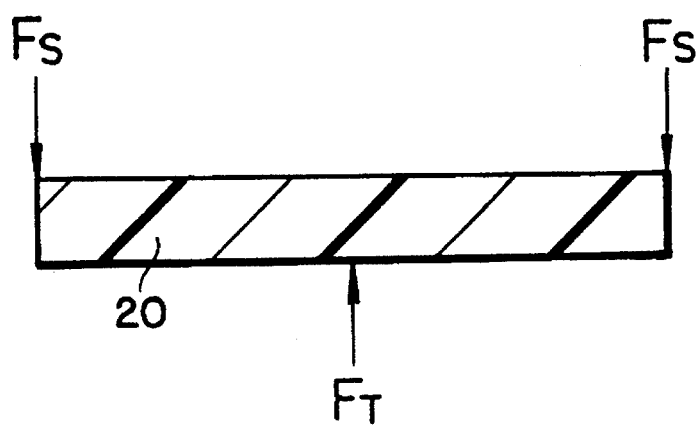
FIG. 2B is a segment view of forces acting on a portion of spacer 20.

The arrangement of FIG. 1 is depicted in cross-section in FIG. 2A. As shown in cross-section, the spacer 20 is a hexagon accurately held in place between outer sheath 30 and the inner transmission medium 10. This positioning establishes contact points between the spacer and the protective sheath at 23; and between the spacer and transmission medium at 24. With this arrangement, open areas are formed around the perimeter of the transmission medium, e.g., 25 (between the spacer and sheath) and 26 (between the spacer and transmission medium). The location of open areas vis-a-vis the points of contact create moment arms along the spacer as depicted in FIG. 2B. It is the moment arms thereby created that act to absorb induced shock to the assembly by partial deflection of the semi-rigid spacer 20. In FIG. 2B, F(t) is the force vector imparted by the transmission medium and F(s) is the counteracting force vector imparted by the sheath.

Representative dimensions for the components depend on the actual implementation of the system. For use in a IR thermometer, the transmission medium will typically have a diameter of 0.123/0.118 inches. The outer sheath will have an inner diameter of approximately 0.158/0.154 inches. Finally, in such an arrangement, the spacer will have an "effective" diameter of 0.140 inches, a thickness of 0.008 inches and is preferably formed by extrusion using polyurethane or nylon.

Figure 3A:
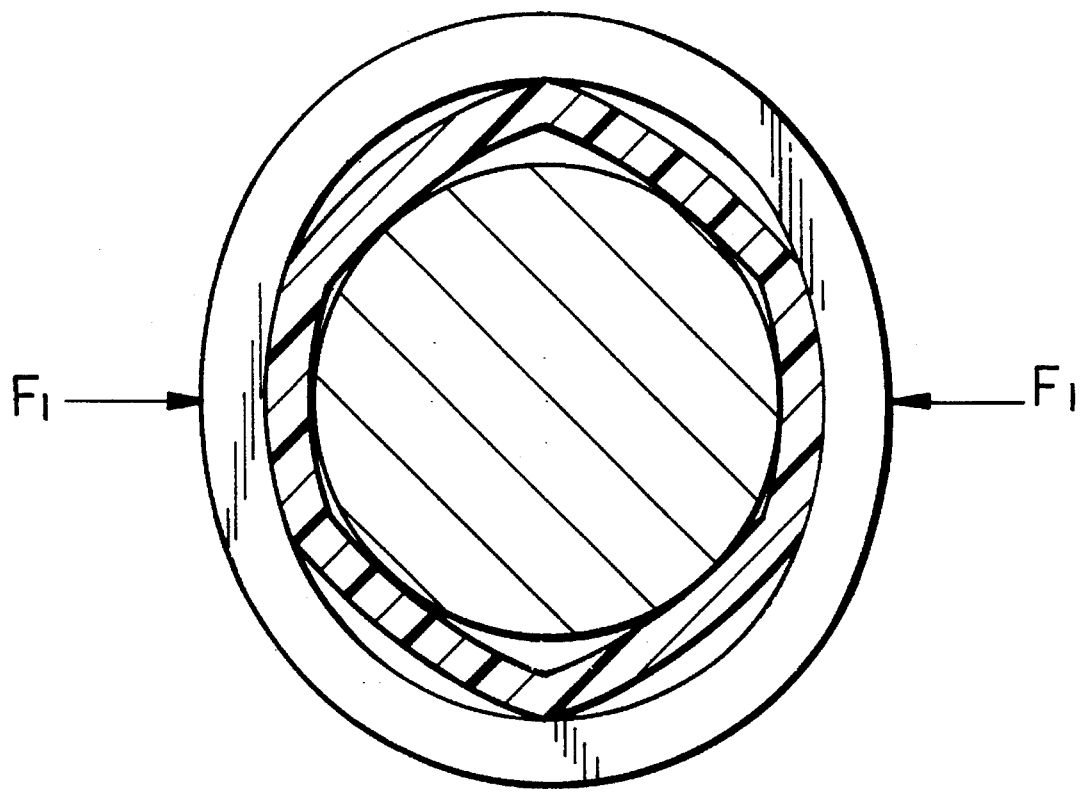
FIG. 3A is a second cross-sectional view of the embodiment of FIG. 1, under the influence of stress.
Figure 3B:
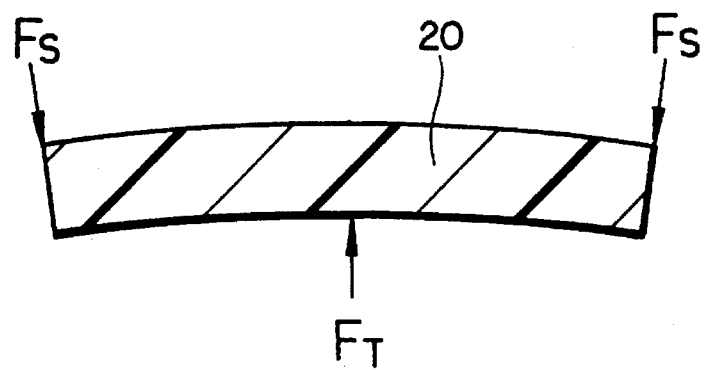
FIG. 3B is a segment view of the spacer of 3A.

Turning now to FIG. 3A, the arrangement of FIG. 2 is shown, but now undergoing an external force F(1) representing a shock or bump to the assembly. This force acts to distort the outer protective sheath from the circular cross-section to a cross-section of generally elliptical shape. The application of this force is, however, not translated to the inner transmission medium. To the contrary, this medium remains circular, as the external force is absorbed by the counter balancing distortion of the spacer, and, particularly, the deflection of the semi-rigid moment arms within the spacer. This can be clearly seen in FIG. 3B depicting a portion of spacer 20 undergoing force induced deflection, via force vectors F(s) and F(t).

Figure 4:
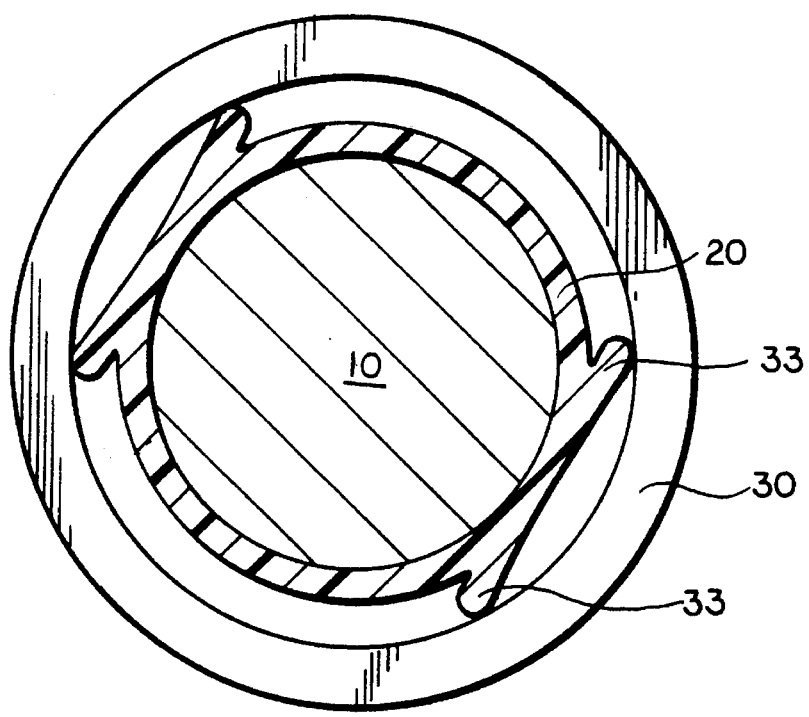
FIG. 4 is a second embodiment, shown in cross-section view.

Turning now to FIG. 4, a second inventive arrangement is shown, wherein the spacer 20 is completely contiguous with the transmission medium 10, but spaced from the outer sheath by acutely angled tabs 33. In this arrangement, induced forces are absorbed by the deflection of the angled tabs. Although only four tabs 33 are shown, the use of more tabs, distributed around the perimeter of the spacer 20 is contemplated.

Figure 5A:
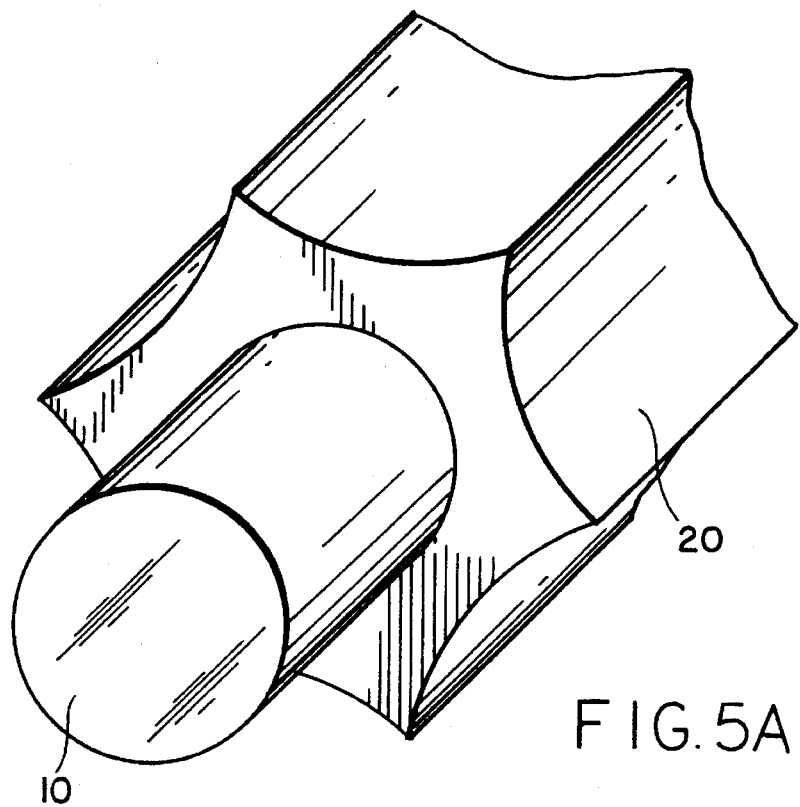
FIG. 5A is a third embodiment, shown in perspective view.
Figure 5B:
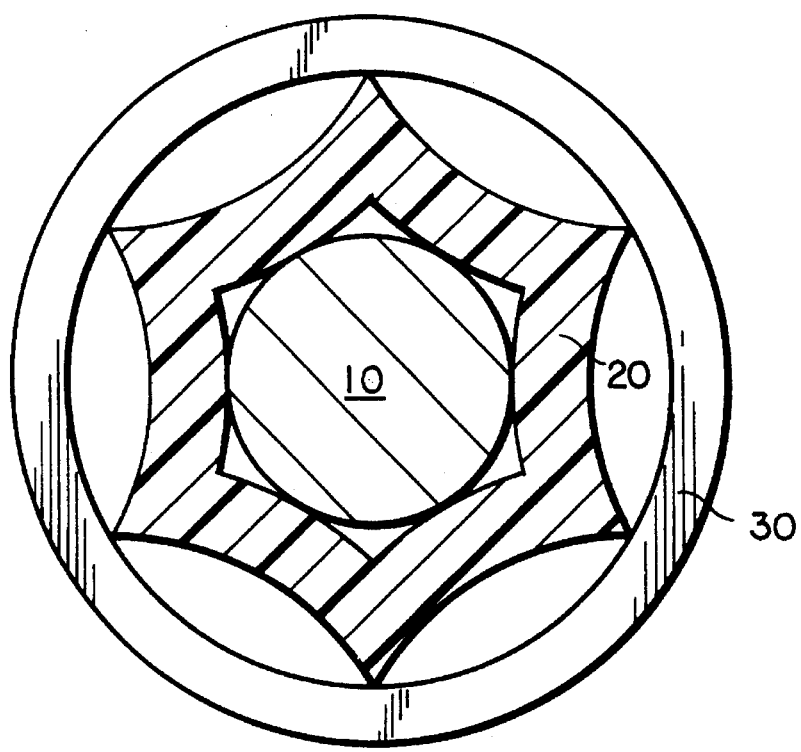
FIG. 5B is a further embodiment.

In FIG. 5A, a further inventive arrangement is shown, one that can be assembled through the use of extrusion techniques. In this arrangement, the spacer has an exterior surface with a star-shaped cross-section and an interior surface shaped to fit snugly over the transmission medium without open areas. In this form, the absorption of forces is accomplished via the flexible and/or compressible nature of the material used to form spacer 20. Alternatively, the spacer may have an interior surface with a cross-section identical to that of its exterior (i.e., star shaped) thereby establishing open areas between the transmission medium 10 and the spacer 20 as depicted in FIG. 5B. In both arrangements of FIG. 5, the outer sheath has a generally cylindrical inner surface.

Figure 6:
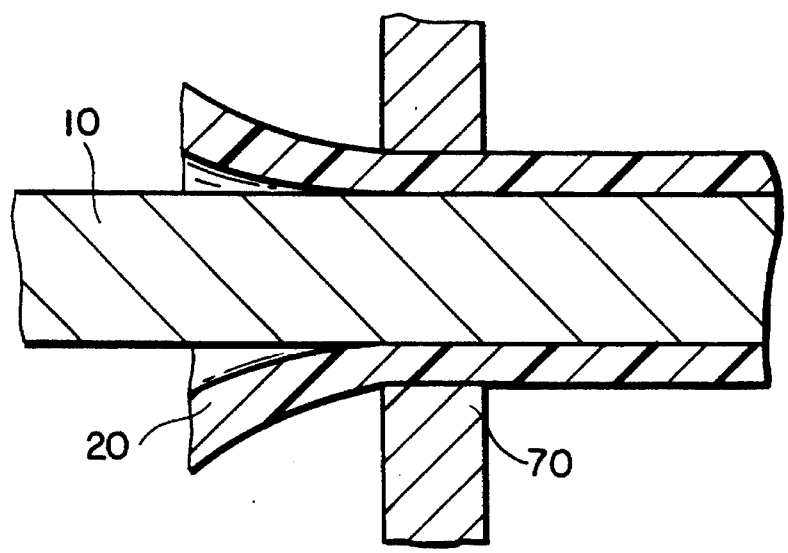
FIG. 6 is a depiction of an extrusion process for making the embodiment of FIG. 5A.

In FIG. 6, an extrusion molding technique for making the foregoing arrangement of FIG. 5A is shown. In this process, the transmission medium 10 is passed through a first die 70 having an opening shaped to correspond to the outer shape of the spacer. Thereafter, the extruded spacer 20 is fitted into a cylindrical sheath, thus forming the open areas between the spacer 20 and the sheath (not shown).

The above descriptions are illustrative of the inventive concepts and many modifications and adaptations thereof will be readily apparent to those skilled in this art without departing from the scope and spirit of the invention.

What is claimed is:

1. In combination in an IR thermometer for measuring radiation emanating from a tympanic membrane of a patient, the improvement comprising an IR wave guide partially encased in a concentric spacer which is further partially encased by a protective sheath wherein said spacer has a first cross-sectional shape that departs from a second cross-sectional shape of said protective sheath or said IR wave guide, thereby creating a series of axially distributed spaces positioned between the spacer and the wave guide or between the spacer and the protective sheath, or between the spacer and the wave guide and between the spacer and the protective sheath.

2. The IR thermometer of claim 1 wherein said spacer is semi-rigid and provides a first plural line contact between said IR wave guide and said spacer or a second plural line contact between the spacer and said protective sheath, or provides a first plural line contact between the IR wave guide and the spacer and a second plural line contact between the spacer and the protective sheath.

3. The IR thermometer of claim 2 wherein said first plural line contact is radially offset from said second plural line contact.

4. The IR thermometer of claim 3 wherein said spacer has plural moment arms and absorbs externally applied forces by distortion of said moment arms.

\* \* \* \* \*